United States Patent [19]

Gruber

[11] Patent Number: 5,621,088

[45] Date of Patent: Apr. 15, 1997

[54] PROCESS FOR DERIVATIZING POLYGLUCOSAMINES

[75] Inventor: James V. Gruber, Somerville, N.J.

[73] Assignee: Amerchol Corporation, Edison, N.J.

[21] Appl. No.: 416,140

[22] Filed: Apr. 10, 1995

[51] Int. Cl.$^6$ ..................................................... C07M 1/00
[52] U.S. Cl. ........................... 536/18.5; 536/18.7; 536/20; 536/124
[58] Field of Search .............................. 536/18.7, 20, 21, 536/18.6, 124, 18.5

[56] References Cited

U.S. PATENT DOCUMENTS 4,954,619  9/1990  Lang et al. ................................. 536/20

Primary Examiner—Elli Peselev
Attorney, Agent, or Firm—W. K. Volles

[57] ABSTRACT

Processes for the preparation of polyglucosamine derivatives, e.g., hydroxypropyl chitosan and carboxymethyl chitosan, are disclosed. The polyglucosamine derivatives can be prepared in a covalently bonded form using a dilute caustic medium. Strong bases and undesirable water-immiscible organic solvents can be avoided. The covalently bonded derivatives dissolve into the dilute caustic medium upon formation. Compositions containing the derivatives and uses for the derivatives are also disclosed.

21 Claims, No Drawings

PROCESS FOR DERIVATIZING POLYGLUCOSAMINES

FIELD OF THE INVENTION

The present invention relates to derivatives of polyglucosamines, and more specifically relates to processes for making covalently bonded derivatives of polyglucosamines.

BACKGROUND OF THE INVENTION

Polyglucosamines are polysaccharides having glucose monomer units with amine functionality in the polysaccharide backbone. Typical polyglucosamines include, for example, chitin, chitosan, and polyglucosaminoglycans which are copolymers of N-acetylglucosamine and various glycan sugars, e.g. hyaluronic acid, chondroitin, heparin, keratan and dermatan.

Chitin and chitosan are commonly used polyglucosamines. Chitin is a glucosamine polysaccharide which contains nitrogen and is structurally similar to cellulose. Chitin is a principle substituent of the shells of various crustaceans such as shrimps, crabs and lobsters. It is also found in some fungi, algae, insects and yeasts. Chitin is not one polymer with a fixed stoichiometry but a class of polymers of N-acetylglucosamine with different crystal structures and degrees of deacetylation and with fairly large variability from species to species. Chitosan is a generic term for a deacetylated derivative of chitin. Generally speaking, chitosan is a water-insoluble random copolymer of beta-1,4-glucosamine and N-acetyl-beta-1,4-glucosamine. Typically, the degree of deacetylation in the chitosan is about 70–100 percent, although deactylation values as low as 50% have been produced commercially.

Both chitin and chitosan are insoluble in water, dilute aqueous bases and most organic solvents. However, unlike chitin, chitosan is soluble in dilute aqueous acids, e.g., carboxylic acids, as the chitosan salts. Solubility in dilute aqueous acid is therefore a simple way to distinguish chitin from chitosan.

Chitosan is unique in that it is a polysaccharide which contains primary amine groups. Chitosan and its derivatives are therefore often used as materials in metal recovery, ion exchange resins, surgical dressings and sutures, ocular bandages and lenses, and other applications in the biomedical field. Chitosan forms water-soluble salts with many organic and inorganic acids and these chitosan salt derivatives are also often used in biomedical applications.

Although polyglucosamine salts such as, for example, chitosan salts have been found to be very useful, such salts can have functional drawbacks when the pH of the system in which they are employed rises above the isoelectric point of the polyglucosamine. At this pH, (typically at pH greater than 7.0), the salt becomes the free amine and consequently water-insoluble.

In order to circumvent the difficulties associated with the water-insolubility of polyglucosamines, the polyglucosamines can be derivatized with a variety of hydrophilic electrophiles to disrupt the secondary crystal structure of the polyglucosamines and allow the polymer to dissolve more easily into aqueous solutions. Some of the known reagents used to make such derivatives of chitosan, include for example, ethylene and propylene oxide, quaternary ammonium reagents, monochloroacetic acid and various anhydrides. The preparation of some of these derivatives can require the use of special equipment to handle high vapor pressure materials, such as ethylene oxide, highly corrosive materials, such as strong acids and bases, the isolation and control of undesirable reactants, solvents and by-products, such as alkylene glycols, toluene, monochloroacetic acid and anhydrides.

In view of the difficulties associated with preparing certain polyglucosamine derivatives, such as, for example, the chitosan derivatives described above, new processes are desired for preparing such polyglucosamine derivatives which can utilize conventional equipment and less toxic reactants.

SUMMARY OF THE INVENTION

The present invention provides processes for preparing polyglucosamine derivatives having a covalently bonded substituent. By the present invention, it is now possible to prepare water-soluble polyglucosamine derivatives having covalently bonded substituents by a process which utilizes a dilute caustic medium, with or without water-miscible organic solvents, for example, acetone, 2-propanol, etc., and which does not require the use of strong bases or undesirable, water-immiscible organic solvents such as the, for example, toluene, hexane, etc.

Quite surprisingly in accordance with the present invention, the reaction starts with a slurry of the polyglucosamine salt in the dilute caustic medium and ends with the covalently bonded derivative dissolved in the dilute caustic medium. As a result, it is possible to easily remove residual insoluble materials from the reaction product.

DETAILED DESCRIPTION OF THE INVENTION

The polyglucosamines suitable for use in the present invention are polysaccharides having glucose monomer units with amine functionality in the saccharide backbone. It is desirable that the polyglucosamines contain free amine groups and preferably a sufficient amount of free amine groups to promote covalent bonding with the electrophilic organic reagent (hereinafter described). As used herein, the term "free amine" means amine groups which are nucleophilic, i.e., capable of forming a covalent bond with an electrophile. More preferably, the free amine groups are primary amine groups. It is also preferred that at least 50 percent, and more preferably at least 75 to 100 percent, of the amine groups in the polyglucosamine are free amines.

The molecular weight of the polyglucosamines suitable for use in accordance with the present invention typically ranges from about 1000 to 3,000,000 grams per gram mole, preferably from about 10,000 to 1,000,000 grams per gram mole, and more preferably from about 10,000 to 750,000 grams per gram mole. As used herein, the term "molecular weight" means weight average molecular weight. Methods for determining the weight average molecular weight of polyglucosamines are known to those skilled in the art. Typical methods include, for example, light scattering, intrinsic viscosity, and gel permeation chromatography. The determination of weight average molecular weight by gel permeation chromatography is preferred in accordance with the present invention. The viscosity of the polyglucosamines suitable for use in accordance with the present invention typically ranges from about 1.1 to 10,000 centipoise and preferably from about 1.1 to 2000 centipoise. Unless otherwise indicated as used herein the term "viscosity" refers to the viscosity of a 1.0 weight percent dilute aqueous acid solution of the polyglucosamine measured at 25° C. with a Brookfield viscometer. Such viscosity measuring techniques are known to those skilled in the art.

Examples of polyglucosamines suitable for use in accordance with the present invention, include for example, chitin, chitosan, hyaluronic acid, heparin, chondroitin, e.g., as chondroitin sulfate, keratan, e.g., as keratan sulfates, and dermatan, e.g., as dermatan sulfate. Chitosan is a preferred polyglucosamine suitable for use in accordance with the present invention. Typically, the polyglucosamines are at least partially deacetylated to provide free amine groups. The degree of deacetylation of the polyglucosamines is preferably from about 50 to 100 percent, more preferably from about 70 to 99 percent and most preferably from about 75 to 95 percent. Methods for deacetylating polyglucosamines are known to those skilled in the art. In addition such deacetylated polyglucosamines are commercially available.

The electrophilic organic reagents suitable for use in the present invention contain from about 2 to 18 carbon atoms or more per molecule and typically from about 2 to 10 carbon atoms per molecule. In addition, the electrophilic organic reagents contain groups which are reactive, i.e., capable of forming a covalent bond with a nucleophile. Typical electrophilic organic reagents include, for example, ethylene oxide; propylene oxide; butylene oxide; glycidol; 3-chloro-1,2-propanediol; methyl chloride; ethyl chloride; isatoic anhydride; succinic anhydride; octenylsuccinic anhydride; acetic anhydride; gamma-butyrolactone; b-propiolactone; 1,3-propanesultone; acrylamide; glycidyltrimethylammonium chloride; glycidyldimethyl alkylammonium chloride, such as lauryl; sodium chlorosulfonate; dimethyl sulfate; sodium chloroethanesulfonate; monochloracetic acid; alkyl phenyl glycidyl ethers; glycidyl trimethoxysilanes; 1,2-epoxy dodecane. One preferred class of electrophilic organic reagent includes those oxirane carboxylic acids which contain an epoxide group, at least one acid group, preferable a diacid group, and have from about 3 to 6 carbon atoms per molecule. Other preferred oxirane carboxylic adds include cis-epoxysuccinic add and trans-epoxysuccinic add, with cis-epoxysuccinic acid being especially preferred. Methods for the preparation of electrophilic organic reagents suitable for use in accordance with the present invention are known to those skilled in the art. In addition, such materials are commercially available.

In accordance with the present invention the electrophilic organic reagent may react with either the free amine or the underivatized hydroxyl groups of the polyglucosamine. Such reactions as might occur will depend on the degree of electrophilicity of the reagent. For example, monochloroacetic acid is a very reactive electrophile. By the process of the present invention, reaction of a polyglucosamine with monochloroacetic acid will occur on both the amine and hydroxyl groups of the polyglucosamine. On the other hand, cis-epoxysuccinic acid, which is a much weaker electrophile, reacts almost exclusively on the amine group of the polyglucosamine. Likewise, it is known to those skilled in the art that the amine functionality of the polyglucosamine is generally regarded as a stronger nucleophilic site than the hydroxyl groups. Consequently, weaker electrophiles will tend to react more readily with the amine groups than with the hydroxyl groups of the polyglucosamine.

Preferably, an effective amount of electrophilic organic reagent is substituted onto the polyglucosamine to achieve the desired properties of the polyglucosamine derivative. As used herein, the term "molar substitution", also referred to as "MS", means the moles of electrophilic organic reagent substituted on the polyglucosamine per mole of glucosamine monomer unit. Preferably, the polyglucosamine derivatives of the present invention have a M.S. of from about 0.03 to 10.0 and more preferably from about 0.5 to 5.0 moles of the electrophilic organic reagent per mole of glucosamine monomer unit.

The polyglucosamine derivatives of the present invention are water-soluble. As used herein the term, "water-soluble" means that at least one gram and preferably at least 2 grams, of the polyglucosamine derivative are soluble in 100 grams of water at 25° and one atmosphere. The extent of water-solubility can be varied by adjusting the extent of the electrophilic organic reagent substitution on the polyglucosamine. Such techniques for adjusting the water-solubility are known to those skilled in the art.

Preferably, the covalently bonded polyglucosamine derivatives of the present invention are prepared in accordance with the following procedure.

The starting material is a polyglucosamine salt which can be made from the above-described polyglucosamines and a variety of known acids including but not limited to formic, acetic, monochloroacetic, N-acetylglycine, acetylsalicylic, fumaric, glycolic, iminodiacetic, itaconic, DL-lactic, maleic, DL-malic, nicotinic, 2-pyrrolidone-5-carboxylic, salicylic, succinamic, succinic, ascorbic, aspartic, glutamic, glutaric, malonic, pyruvic, sulfonyldiacetic, thiodiacetic and thioglycolic acids, as well as various mineral acids including hydrochloric, sulfuric, phosphoric, etc. A typical salt, for example, might include chitosan lactate, chitosan epoxysuccinate, chitosan monochloroacetate, chitosan salicylate, chitosan itaconate, chitosan pyrrolidone carboxylate, chitosan glycolate, chitosan hydrochloride and mixtures thereof. Preferred salts include for example, chitosan lactate available from Amerchol Corporation, Edison, N.J. as Kytamer® L and chitosan pyrrolidone carboxylate also available from Amerchol Corporation as Kytamer® PC. Also capable of reacting are the salts of the oxirane carboxylic acids described herein, such as, for example, the cis-epoxysuccinic salt of chitosan, when it is desired to make the corresponding covalently bonded derivative.

The salt is combined, either as an aqueous slurry, a slurry in an aqueous organic solvent, or preferably as a substantially dry powder, with a an aqueous medium containing a caustic to form a slurry of the salt in the aqueous medium. The selection of the caustic is not critical and caustics such as, for example, sodium hydroxide or potassium hydroxide can be utilized. The concentration of the caustic in the aqueous medium is typically from about 1 to 50 weight percent, preferably from about 2 to 25 weight percent, and more preferably from about 3 to 10 weight percent caustic based on the weight of the aqueous medium, i.e., a dilute caustic medium. The amount of caustic added should be effective to neutralize any acid groups of the electrophilic organic reagent to be introduced subsequently, as well as, the acid groups on the polyglucosamine salt. In addition, some electrophilic reagents such as, for example, monochloroacetic acid, generate acidic species as they react. These must be accounted for when calculating the amount of caustic required for the reaction. Typically, the effective amount of caustic added is sufficient to neutralize all acidic species introduced or produced during the reaction plus any additional amount needed such that the reaction mixture is a swollen slurry of the polyglucosamine at a pH of from about 7.5–14.0, preferably from about 8.0–13.0. If the epoxysuccinic acid salt or monochloroacetic acid salt of the polyglucosamine is used as the starting polymer, the minimum requirement of caustic can be reduced because, in these cases, a portion of the salt has already been neutralized by the polyglucosamine. The addition of the polyglucosamine salt to the aqueous medium is preferably done under stirring conditions and in the liquid phase for a time period of from about 1–3 hours and preferably about 1 hour. The temperature and pressure used during this initial step to swell the polymer are typically from about room temperature to 100° C. and atmospheric pressure respectively, although neither the temperature nor the pressure is critical for this step.

Preferably, the swelling of the polymer and subsequent addition of the electrophilic organic reagent is conducted with little or no water-immisible organic solvents, e.g., toluene, hexane, etc. Preferably, the aqueous medium comprises less than 10 weight percent, preferably less than 5 weight percent and more preferably less than 1 weight percent of water-immiscible organic solvents based on the total weight of the aqueous medium. Optionally, the swelling of the polymer and the subsequent addition of the electrophilic organic reagent may be conducted and controlled with water-miscible organic solvents, e.g., acetone, alcohols such as methanol, ethanol, n-propanol, isopropanol, t-butanol, and the like. Such water-miscible solvents should be added at a level which does not inhibit the swelling of the chitosan salt. As such, an amount typically of from about 1 to 50 weight percent, preferably from about 10 to 30 weight percent, based on the weight of the aqueous medium should be employed.

After the initial swelling of the polymer in the dilute caustic medium, an appropriate amount of the electrophilic organic reagent is added to achieve the desired degree of substitution of the electrophilic organic reagent on the polyglucosamine. Typically, the amount of electrophilic organic reagent introduced will range from about 0.05 to 10 moles, and more preferably from about 0.5 to 5 moles of electrophilic organic reagent per mole of glucosamine monomer unit. Those skilled in the art will recognize that the amount of electrophilic organic reagent required to be added to conduct the covalent substitution will be lower in the case where the salt of the electrophilic organic reagent (in the case where the electrophilic organic reagent is an acid) is used as a starting material. The covalent substitution is accomplished by maintaining the mixture at a temperature of less than about 200° C., preferably from about 30° to 150° C. and more preferably from about 80° to 100° C., e.g., by heating. The pressure used to effect the substitution is not critical; provided, however, that it is preferred to maintain the system in the liquid phase. Certain reactions, e.g., reactions with alkylene oxides, like ethylene or propylene oxide, are best conducted in sealed reaction vessels in order to minimize loss of the volatile reagents from the reaction. In these reactions, pressures may exceed atmospheric pressure. Such reactions, however will occur in the process of the present invention at atmospheric pressure in an open system if a sufficiently effective condensing mechanism is employed to minimize the loss of these electrophiles at the elevated reaction temperatures required for the reaction. The reaction is typically conducted for a time period of from about 1 to 48 hours and more typically from about 8 to 24 hours.

In accordance with the process of the present invention, the covalently bonded polyglucosamine derivative dissolves into the reaction medium upon formation. As this occurs, the viscosity of the reaction medium increases with higher molecular weight polyglucosamines giving higher viscosity solutions. The dissolution of the reaction product provides a convenient means for determining when the reaction is complete. Alternatively, the extent of reaction can be determined by methods known to those skilled in the art such as, for example, infra red analysis or gas chromatography. Upon completion of the reaction, the reaction mixture is cooled down preferably to room temperature, i.e. about 25° to 30° C.

In a preferred aspect of the invention, the reaction mixture is then neutralized with an organic or mineral acid such as for example, HCl, $H_3PO_4$, acetic acid, lactic acid or similar acids.

The product can be used directly upon completion of the reaction or after neutralization or after partial or complete isolation of the covalently bonded polyglucosamine derivative from the reaction product mixture. Thus, typically the reaction product comprises a composition containing from about 0.1 to 99 weight percent of the polyglucosamine derivative and from about 0.1 to 99 weight percent of various organic by-products from the reaction. These by-products are typically the acid from the polyglucosamine salt starting material and hydrolysis products from the electrophilic organic reagents. In addition, various dimeric and homopolymeric by-products may form, especially, if alkylene oxides are employed. The acid by-products are selected from the group consisting of tartaric acid, lactic acid, acetic acid, glycolic acid, pyrrolidone carboxylic acid, or hydrochloric acid or salts thereof and mixtures of these acids or salts or both. Depending upon the extent of isolation of the polyglucosamine derivative, the composition may further comprise from about 0.1 to 90 weight percent water, and often from about 10 to 80 weight percent water based on the total weight of the composition. Typically, the composition comprises from about 0.05 to 30 weight percent of the polyglucosamine derivative, from about 0.01 to 15 weight percent of the above mentioned by-products and from about 55 to 99.94 weight percent water.

Residual by-products from the reaction may also include, for example, the sodium salt of the initial polyglucosamine acid salt starting material, residual inorganic salts, e.g. NaCl, KCl, NaOH and the like, and low molecular weight aminoglucans. An advantage of starting the reaction with a polyglucosamine electrophilic organic acid salt, e.g., chitosan epoxysuccinate or chitosan monochloroacetate, is the presence of the corresponding acids, tartaric acid and glycolic acid, respectively, as residual by-products at completion of these reactions. By employing chitosan epoxysuccinate or chitosan monochloroacetate, for example, initially in the reaction, the problem of removing additional residual organic acids is minimized and the major contaminants become the innocuous inorganic salts. Under such conditions, the product might be manufactured and used as a solution containing the by-product acid salts.

When it is desired to isolate the polyglucosamine derivative, a variety of options known to those skilled in the art exist. One for example is by the addition of an organic solvent, e.g., acetone or 2-propanol, to force the precipitation of the polymer. Another more preferred method is to isolate the polymer by passing the neutralized reaction product mixture through a membrane. Such membrane separations include, for example, ultra filtration, micro filtration, reverse osmosis, nano filtration, dialysis or electrodialysis. Details concerning such membrane technology are known to those skilled in the art. The final product can be concentrated and used as a solution or dried to a powder by lyophilization, spray drying, drum drying or any of a number of additional methods of drying such aqueous solutions known those skilled in the art.

When it is desired to have multiple functional groups on the polyglucosamine, such groups can be reacted onto the polyglucosamine either in succession or simultaneously to provide the desired derivative. For example, it may be desirable to derivatize chitosan with epoxysuccinic acid on the free amine group and monochloroacetic acid on the hydroxyl groups. In this case, a successive reaction of cis-epoxysuccinic acid followed by treatment with monochloroacetic acid would accomplish this. On the other hand, if greater substitution of the monochloroacetate groups on the polyglucosamine nitrogen is desired, the reactions could be run simultaneously. Those skilled in the art will recognize that compounds made by the processes of the present invention can be modified further by standard reactions known to those skilled in the art including, but not limited to, formation of carboxylic acid salts (e.g. sodium, potassium or calcium), carboxylate esters, amides, or anhydrides, and amine salts made by acidification of the polyglucosamine derivatives with any of a variety of organic or mineral adds (e.g. HCl, $H_3PO_4$, acetic, glycolic, lactic or pyrrolidone carboxylic).

The polyglucosamine derivatives of the present invention will have a variety of uses, including, but not limited to, neutraceuticals, pharmaceuticals, cosmetics and therapeutics, as well as, in various industrial applications including, for example, water treatment, detergents, or adsorption, metal complexation, paper flocculation, textile sizing, membrane applications such as food coatings and gas separations, and as solid supports for chromatographic stationary phases.

A preferred end-use application for polyglucosamine derivatives of the present invention is as a component in a personal care composition, e.g., skin creams, lotions, cleansing products, conditioners, hairsprays, mousses, gels and the like, which comprises the polyglucosamine derivative and other personal care ingredients. As used herein, the term "personal care ingredients" includes, but is not limited to, active ingredients, such as, for example, spermicides, virucides, analgesics, anesthetics, antibiotic agents, antibacterial agents, antiseptic agents, vitamins, corticosteroids, antifungal agents, vasodilators, hormones, antihistamines, autacoids, kerolytic agents, anti-diarrhea agents, anti-alopecia agents, anti-inflammatory agents, glaucoma agents, dry-eye compositions, wound healing agents, anti-infection agents, and the like, as well as solvents, diluents and adjuvants such as, for example, water, ethyl alcohol, isopropyl alcohol, higher alcohols, glycerine, propylene glycol, sorbitol, preservatives, surfactants, menthol, eucalyptus oil, other essential oils, fragrances, viscosity adjusters and the like. Such personal care ingredients are commercially available and known to those skilled in the art.

The amount of the polyglucosamine derivatives present in the personal care composition will vary depending upon the particular care composition. Typically, however, the personal care composition will comprise from about 0.1 to 99 weight percent of the polyglucosamine derivative of the present invention.

Typical formulations may contain, for example, 90 weight percent of the polyglucosamine derivative. Often, the concentration of the polyglucosamine derivative in the personal care composition will range from about 0.5 to 50 weight percent, and more often from about 0.5 to 10 weight percent based on the personal care composition.

Typical cleansing systems may contain water and a surfactant, like ammonium lauryl sulfate and ammonium laureth sulfate and, auxiliary surfacts like lauramide DEA or coco betaines, thickening agents like NaCl, hydroxypropyl cellulose or PEG-120 methyl glucose dioleate, pH adjusters like citric acid or triethylamine and a chelating agent like tetrasodium EDTA. Likewise, bar soaps may contain surfactants like tallowate or cocoate and a feel modifier like glycerin.

Typical areosol and non-areosol hairsprays may contain a solvent like a low molecular weight alcohol and, or water, a propellent like dimethylether or a hydrocarbon, a resin like poly(vinylpyrrolidone)/vinyl acetate copolymer and, or poly(vinylmethacrylate)/methacrylate copolymer, a plasticizer like dimethicone copolyol and a neutralizing agent like aminomethyl propanol.

Typical creams may contain an oil like mineral oil, water, an emulsifier like methyl glucose sesquistearate or PEG-20 methyl glucose sesquistearate, a feel modifier like isopropyl palmitate or PEG-20 methyl glucose distearate, a polyhydridic alcohol like methyl gluceth-20 and a stabilizer like carbomer.

Typical mousses may contain a solvent like water and, or alcohol, a surfactant like oleth-10, a feel modifier like isopropyl palmitate and a resin like polyquaternium-10 or poly(vinylmethacrylate)/methacrylate copolymer.

Typical gels may contain a viscosifying agent like carbomer, a solvent like water and, or alcohol, a styling resin like poly(vinylmethacrylate)/vinylmethacrylate copolymer, a neutralizing agent like aminomethyl propanol and a feel modifier like methyl gluceth-20.

Further details concerning the ingredients, amounts of ingredients and preparation methods of personal care compositions such as described above are known to those skilled in the art. See, for example, the above referenced U.S. Pat. No. 4,780,310.

The following examples are provided for illustrative purposes and are not intended to limit the scope of the claims which follow.

The following ingredients were used in the examples.

The following ingredients were used in the examples:

| | |
|---|---|
| 2-propanol- | available from Aldrich Chemical Co., Milwaukee, Wisconsin. |
| Chitosan-1- | a low molecular mass material ($M_r$~70,000) available from Fluka, Ronkonkoma, New York. |
| cis-- epoxy- succinic acid - | available from TCI America, Portland, Oregon. |
| NaOH- | sodium hydroxide available from J.T. Baker, Phillipsburg, New Jersey. |
| tartartic acid- | available from Aldrich Chemical Co., Miklwaukee, Wisconsin |
| Kytamer® L- | chitosan lactate having a weight average molecular weight of 300,000 to 750,000 grams per mole available from Amerchol Corporation, Edison, New Jersey. |
| acetic acid- | available from Aldrich Chemical Co., Milwaukee, Wisconsin. |
| trans-- epoxy- succinic acid- | available from TCI America, Portland, Oregon. |
| fumaric acid- | available from Aldrich Chemical Co., Milwaukee, Wisconsin. |
| maleic acid- | available from Aldrich Chemical Co., Milwaukee, Wisconsin. |
| Chitosan-2- | A medium molecular mass ($M_r$~750,000) material available from Fluka, Ronkonkoma, New York. |
| Polymer JR® - | a cationic cellulosic available from Amerchol Corporation, Edison, New Jersey. |
| HCl- | hydrochloric acid available from J.T. Baker, Phillipsburg, New Jersey. |
| propylene oxide | available from Aldrich Chemical Co., Milwaukee Wisconsin. |
| sodium chloro- acetate- | available from Aldrich Chemical Co., Milwaukee Wisconsin. |

EXAMPLE 1

Reaction of Chitosan Lactate With Propylene Oxide Hydroxypropyl Chitosan

In a 2000 ml round bottom flask, 100 g of Kytamer L was slurried in 478 g of 5 weight percent aqueous NaOH and the polymer was allowed to swell for 1 hour. Then, 208 g of chilled propylene oxide was added quickly via an addition funnel. The reaction was warmed to 45° C. whereupon a gentle reflux began. The reflux was contained by using a condenser chilled to −5° C. After 5 hours, the reaction temperature had risen to 95° C. where it was maintained for 20 hours. The homogeneous reaction product mixture was cooled to 25° C. and neutralized to pH 9.0 with 50 weight percent aqueous acetic acid. The viscous solution was dialyzed [Spectrum, 1000 Molecular Weight Cutoff (MWC)] against distilled water for 24 hours, filtered to remove insoluble residues and the solution was concentrated to afford 1167 g of product as a 15 weight percent solids solution. NMR examination, in accordance with the procedure described in Example 15, of a freeze-dried portion of the product indicated that the chitosan had a nitrogen M.S. of 0.85 and an oxygen M. S. of 1.17.

EXAMPLE 2

Reaction of Chitosan Lactate With Sodium Chloroacetate Carboxymethyl Chitosan

In a 1000 ml round bottom flask, 25 g of Kytamer L was slurried in 200 g of 5 weight percent aqueous NaOH and the slurry was stirred for 1 hour. The reaction mixture was heated to 90° C. and 58.2 g of sodium chloroacetate (Aldrich) was added as a solid in 4 portions at 10 minute intervals. During addition, the pH, which dropped upon the addition of the acid, was maintained at 10.0–10.5 by the addition of 4 weight percent aqueous NaOH. After stabilization of the pH, the reaction was stirred for 24 hrs at 90° C. The resulting homogeneous reaction mixture was cooled to 25° C. and neutralized to pH 8.5 using a 50 weight percent aqueous acetic acid solution. The resulting solution was dialyzed (Spectrum 1000 MWC) against distilled water and freeze-dried to afford 11.9 g of chitosan product. NMR analysis, in accordance with the procedure described in Example 15, confirmed that the product, which was water-soluble, was N,O-carboxymethyl chitosan. Based on the NMR analysis, the product had a nitrogen M. S. of 0.25 and an oxygen M. S. of 0.08.

EXAMPLE 3

Chitosan Cis-Epoxysuccinate

One hundred and fifty milliliters (ml) of 2-propanol and 75 ml of water were combined into a 500 ml roundbottom flask. Then 12.2 (0.075 mol) of Chitosan-1 was slurried into the aqueous medium by agitation with a stirrer. To the slurry was added 10.0 g (0.075 mol) of cis-epoxysuccinic acid and the reaction mixture was warmed to 75° C. for one hour. The slurry temperature was lowered to 25° C. and the product was filtered. The resulting chitosan salt was washed with 300 ml of 2-propanol. The resulting chitosan cake was extracted in a Soxhlet extractor with 2-propanol for 24 hours. After drying, the product weight had increased to 18.7 g indicating 6.5 g of the cis-epoxysuccinic acid had reacted with available chitosan amine.

EXAMPLE 4

N-[(2-Hydroxy-1,2-Dicarboxy)Ethyl]Chitosan

To a 500 ml roundbottom flask was charged 216 g of a 5 weight percent aqueous NaOH solution. To this solution was added 15.0 g of the chitosan epoxysuccinate from Example 1, and the slurry was agitated for one hour to allow the polymer to swell. Then, 11.2 g of cis-epoxysuccinic acid was added (total epoxide 0.12 mol, 2.0 equivalents). The heterogeneous mixture was heated to a temperature of 100° C. and refluxed for 24 hours. As the reaction progressed, the covalently bonded chitosan derivative went into solution.

The resulting homogeneous solution was cooled to 25° C. and the pH of the reaction mixture was adjusted to 8.5 by addition of 15 weight percent aqueous tartaric acid solution. The product mixture was filtered to remove 4.2 g of insoluble residue. The filtrate, which contained the product and residual tartaric acid salts, was dialyzed [Spectrum, 500 molecular weight cutoff (MWC)] against distilled water for 24 hours. The product was isolated by freeze-drying to afford 10.3 g of N-[(2-hydroxy-1,2-dicarboxy)ethyl]chitosan as pale yellow flakes.

EXAMPLE 5

N-[(2-Hydroxy-1,2-Dicarboxy)Ethyl]Chitosan

To 396 g of a 5 weight percent aqueous NaOH solution in a 1000 ml roundbottom flask was slurried 25.0 g of Kytamer® L. The slurry was agitated for 1 hour, whereupon 26.0 g of cis-epoxysuccinic acid was added and the heterogeneous mixture was heated to 90° C. for 36 hours.

The resulting homogeneous solution was cooled to 25° C. and the pH was adjusted to 8.5 using 50 weight percent aqueous acetic acid. The solution was filtered to remove 1.5 g of insoluble residue and the resulting filtrate was dialyzed (Spectrum, 1000 MWC) against distilled water for 24 hours. The product was isolated by freeze-drying to afford 24.3 g of N-[(2-hydroxy-1,2-dicarboxy)ethyl]chitosan as clear, off-white flakes.

EXAMPLE 6

N-[(2-Hydroxy-1,2-Dicarboxy)Ethyl]Chitosan

Following the procedure outlined in Example 3, a similar reaction was run, but trans-epoxysuccinic acid was substituted for the cis-epoxysuccinic acid. After 36 hours of heating at reflux the reaction mixture was still heterogeneous. After cooling and working the reaction up as described in Example 3, 3.5 g of soluble product was isolated after freeze-drying. The bulk of the reaction mixture remained insoluble.

CONTROL EXAMPLE 7

Attempted Reaction of Chitosan With Cis-Epoxysuccinic Acid

An attempt was made to react chitosan (not a chitosan salt) with cis-epoxysuccinic acid. Thus, 7.5 g of Chitosan-2 was slurried with 147.2 g of 5 weight percent aqueous NaOH and the slurry was stirred for 1 hour. Then, 12.3 g of cis-epoxysuccinic acid was added to the reaction and the temperature was brought to 95° C. for 36 hours. The resulting heterogeneous reaction mixture was cooled to room temperature and the pH of the slurry was adjusted to 8.5 using 15 weight percent aqueous tartaric acid solution. The insoluble material was filtered and dried to afford 6.41 g of unreacted chitosan. NMR examination of the filtrate and supernant indicated only chitosan and tartaric acid.

EXAMPLE 8

Reaction of Chitosan Lactate With Cis-Epoxysuccinic Acid Followed By Propylene Oxide In a 1000 ml roundbottom flask, 25.0 g (0.10 mol) of Kytamer L (chitosan lactate) was slurried in 158.4 g of a 5% NaOH solution. The slurry was stirred for 1 hr at 25° C. 6.53 g (0.05 mol) of cis-epoxysuccinic acid was added and the reaction was heated to 90° C. and run for 36 hrs. The reactor was than equipped with a condenser chilled to –5° C. and 17.3 g (0.30 mol) of propylene oxide was introduced into the reaction mixture. The reaction temperature was maintained at 90° C. for an additional 36 hrs. The resulting reaction mixture was cooled to 25° C. and the pH was adjusted to 8.5 with a 15% aqueous lactic acid solution. The resulting viscous, homogeneous solution was dialyzed (Spectrum membrane, 1000 MWC) against distilled water for 24 hrs. 1.57 g of insoluble residue was removed by filtration and the resulting solution was freeze-dried to afford 17.5 g of product as white flakes.

CONTROL EXAMPLE 9

Attempted Reaction of Cis-Epoxysuccinic Acid Following Example 1 of U.S. Pat. No. 4,929,722

To 92 ml of 2-propanol and 48 ml of water was added 20.0 g of Chitosan-2. To this slurry was added 12.0 g of glacial acetic acid in 50 ml of 2-propanol over a 5 minute period. After addition of the acid, 30 ml of water was added and the mixture was stirred for 30 minutes. 54.4 g of 50% aqueous NaOH was added and the mixture was stirred for 90 minutes. 31.7 g of cis-epoxysuccinic acid was added. The viscosity of the reaction became unmanagable as the chitosan appeared to gather into a clump in the reaction vessel. An additional 75 ml of 2-propanol and 39 ml of water had to be added to aid stirring. The reaction was then heated at reflux for 36 hrs.

The resulting heterogeneous reaction mixture, which was lumpy and hardened, was neutralized by addition of 15% aqueous tartaric acid solution. The polymer was filtered and a small portion was ground thoroughly. The ground material was extracted with 2-propanol for 24 hrs in a Soxhlet extractor and dried to afford a pale brown solid which was not soluble to any extent in distilled water.

EXAMPLES 10–14

SUBSTITUTION LEVELS

Following the procedure outlined in Example 5, five additional reactions (Examples 8–12) were run using different substitution levels In addition,. The substitution levels of these runs and the products produced in the Examples are shown in Table 1.

structure of the polymer, particularly the nitrogen-substituted (2-hydroxy-1,2-dicarboxy)ethyl portion remained unaffected by the NMR conditions.

Based on two-dimensional heteronuclear correlation NMR maps, the reaction product of chitosan and cis-epoxysuccinic acid is a long chain random terpolymer containing three monomer units. The monomers vary by substitution onto the glucosamine nitrogen and include: I) saccharide-NHCH($CO_2$H)CH(OH)($CO_2$H), II) saccharide-$NH_2$ and III) saccharide-NHC(O)$CH_3$.

Structure I represents the principle reaction product between cis-epoxysuccinic acid and the —$NH_2$ groups. If the reaction is not stoichiometric with the available —$NH_2$ groups, some remain as part of the final product accounting for some of the residual structure II units. In addition, the alkaline reaction conditions most likely hydrolyze some of the N-acetylglucosamine units from the starting chitosan to afford structure II units. The remaining monomer units are the structure III N-acetylglucosamine units present from the original chitosan starting material.

Using the product from Example 3 as a model, if quantitative NMR results are normalized by using one six-membered ring as a unit, the relative concentration of structure I is found to be 0.66+/−0.03. In other words, 66% of the available —$NH_2$ groups reacted with cis-epoxysuccinic acid to form the expected product I. Residual acetate units III account for 19% and the balance, 15%, is attributed to the structure II units. These assignments were used to calculate expected combustion analysis results. Table 2 lists the complete proton and carbon assignments for the new polymers regardless of substitution levels.

TABLE 1

Treatment level verses substitution level[1]

| Example No. | Reagent | Treatment level mol/mol amine | M.S. Nit | M.S. Oxy | Solubility[2] |
|---|---|---|---|---|---|
| 1 | prop. oxide | 9 | 0.85 | 1.17 | soluble |
| 2 | chloroacetic acid | 5 | 0.25 | 0.08 | soluble |
| 4 | cis-epoxysucc | 2 | 0.71 | >.02 | soluble |
| 5 | cis-epoxysucc | 2 | 0.66 | >.02 | soluble |
| 6 | trans-epoxysucc | 2 | 0.2 | >.02 | partial |
| 7 control | cis-epoxysucc | 2 | 0 | 0 | not soluble |
| 8 | cis-epoxy/p.o. | 0.5/3.0 | 0.12/0.53 | >.02/0.17 | soluble |
| 10 control | cis-epoxysucc | 0 | 0 | 0 | not soluble |
| 11 | cis-epoxysucc | 0.5 | 0.27 | >.02 | partial |
| 12 | cis-epoxysucc | 1 | 0.42 | >.02 | soluble |
| 13 | cis-epoxysucc | 1.5 | 0.5 | >.02 | soluble |
| 14 | cis-epoxysucc | 3 | 0.72 | >.02 | soluble |

[1]Determined by NMR. See Example 15.
[2]Determined by mixing product at 1% solids at pH 7.0 for 1 hr, filtering and weighing insolubles

EXAMPLE 15

NEW PRODUCT CHARACTERIZATION

NMR Analysis

NMR spectra of all the samples prepared in these Examples were run on a Bruker AMX-300 spectrometer. The samples were dissolved in pure $D_2O$ or 17 weight percent $CF_3COOD$ when solubility in pure $D_2O$ was negligible or sluggish. In order to facilitate initial assignments, the samples were examined at 55° C. to enhance resolution. At these temperatures, $CF_3COOD$ had an adverse but benign effect on the polysaccharide backbone and the acetyl linkages of the N-acetylglucosamine units. The actual molecular

TABLE 2

Assignment of $^1$H and $^{13}$C Chemical Shifts[1] of the Reaction Product of cis-epoxysuccinic acid and Chitosan.

| Structure | Carbon location | Proton | Carbon |
|---|---|---|---|
| I | 1 | 5.02 | 98.0 |
| I | 2 | 3.37 | 63.6 |
| I | 3 | 4.08 | 71.0 |
| I | 4 | 3.98 | 77.8 |
| I | 5 | 3.70 | 75.6 |
| I | 6 | 3.70, 3.90 | 61.1 |
| I | 2' | 4.85 | 63.5, 63.6 |
| I | 3' | 4.85 | 69.3, 69.5 |

TABLE 2-continued

Assignment of $^1$H and $^{13}$C Chemical Shifts[1] of the Reaction Product of cis-epoxysuccinic acid and Chitosan.

| Structure | Carbon location | Proton | Carbon |
|---|---|---|---|
| II | 1 | 4.86 | 98.6 |
| II | 2 | 3.18 | 56.9 |
| II | 3 | 3.90 | 71.7 |
| III | 1 | 4.58 | 102.2 |
| III | 2 | 3.79 | 56.7 |
| III | 3 | 3.62 | 79.8 |
| III-CH3 | CH3 | 2.04 | 23.0 |

[1]In ppm from external TMS using 17 wt % $CF_3COOD$ at 55° C.

Within the sensitivity of the measurements, double substitution onto the nitrogen did not occur. Also, unambiguous NMR evidence of substitution onto the available oxygens is not apparent. In order to confirm whether cis-epoxysuccinic acid might be reacting with the available hydroxy groups, a reaction was run following the same conditions as described in Example 3 only 25.0 g of Polymer JR® was substituted for the chitosan salt. Polymer JR is a cellulose polysaccharide which varies from chitosan in that the amino group present at the number 2 carbon in chitosan is replaced by a hydroxy group. Polymer JR is a form of cellulose rendered water-soluble by derivatization with ethylene oxide and a quaternary nitrogen containing derivative. After running the reaction for 36 hours, cooling and neutralizing the homogeneous reaction mixture, the product was dialyzed for 24 hours against distilled water. The resulting solution was freeze-dried and 17.3 g of solid material was collected. NMR examination of the resultant material showed only Polymer JR and tartaric acid. The reagent does not appear to react under these conditions with polysaccharides which do not contain reactive amino groups.

CIRCLE® cell. The film was cast onto AgCl discs for analysis.

The solid state and solution spectra at pH 10.0 were found to be very similar as far as the main bands are concerned. However, there were differences in terms of relative band intensifies and shifts in peak positions. These are expected due to changes in hydrogen-bonding with water molecules in the solution state. The $CO_2$— stretching band is observed to be the most intense band at pH 10.0. In the film, it appears at 1601 reciprocal centimeters ($cm^{-1}$) while in solution it is shifted to 1591 $cm^{-1}$. The bands in the cast film observed at 3352 and, 2930 and 2880 $cm^{-1}$ are assigned to OH and CH stretching vibrations, respectively. The CH bending bands are observed at 1460, 1384, and 1313 $cm^{-1}$ in the film and at 1437, 1389, and 1321 $cm^{-1}$ in solution. The C—O stretching bands, usually very intense in the IR spectra, are intense and are observed at 1114, 1072 and 1030 $cm^{-1}$ in the cast film and at 1115, 1070 and 1032 $cm^{-1}$ in solution. The NH stretching bands, usually observed in the 3200–3400 $cm^{-1}$ region probably overlap with the OH stretching bands. However, the NH bending bands, expected in the 1500–1580 $cm^{-1}$ region, are not observed. This shows that the NH species may not be significant at pH 10.0.

The solid state spectrum of the material isolated at pH 2.0 shows bands due to $NH_2+$ groups. Rather broad bands in the 2600–3000 and 2250–2700 $cm^{-1}$ regions are assignable to the $NH_2+$ stretching bands and the intense band at 1640 $cm^{-1}$ is due to the $NH_2+$ bending. The OH and CH stretching bands are observed at 3424 and, 2943 and 2885 $cm^{-1}$, respectively. The acetal C=O stretching band is clearly defined at 1733 $cm^{-1}$. The CH bending bands are observed at 1380, 1319 and 1240 $cm^{-1}$. In addition, the spectrum shows bands due to acid salt species at 3250, 1560 and 1430 $cm^{-1}$. The precise nature of these species can not at present be defined on the basis of FT-IR spectra alone.

TABLE 3

Combustion Analysis for New Products
Combustion data for various Examples

| Example No. | Treatment level (molar)[1] | Carbon Expected[2] | Carbon Found[3] | Hydrogen Expected | Hydrogen Found | Nitrogen Expected | Nitrogen Found |
|---|---|---|---|---|---|---|---|
| 3[4] | 1.0 | 41.92 | 43.26 | 4.85 | 6.89 | 4.73 | 5.14 |
| 4 | 2.0 | 41.92 | 33.52 | 5.58 | 4.91 | 5.72 | 3.53 |
| 5 | 2.0 | 42.73 | 38.29 | 5.66 | 6.02 | 5.77 | 4.68 |
| 6 | 2.0 | 44.38 | 39.90 | 6.47 | 5.80 | 7.62 | 5.68 |
| 10 control | 0.0 | 45.11 | 47.07 | 6.81 | 7.60 | 8.42 | 7.45 |
| 11 | 0.5 | 44.09 | 36.91 | 6.35 | 5.83 | 7.36 | 4.81 |
| 12 | 1.0 | 43.55 | 35.04 | 6.02 | 4.45 | 6.76 | 2.17 |
| 13 | 1.5 | 42.99 | 39.98 | 5.83 | 5.75 | 6.17 | 4.77 |
| 14 | 3.0 | 42.43 | 37.86 | 5.57 | 5.31 | 5.59 | 4.60 |

[1]Moles of cis-epoxysuccinic acid per mole of glucosamine monomer.
[2]Expected values were calculated by % relative contribution of each monomer species [—NHR, —$NH_2$, —$NHC(O)CH_3$] as determined by NMR.
[3]Determined on a dry basis.
[4]Expected values for Example 3 were determined by % relative contribution of each component based on weight gain.

IR Analysis

FT-IR spectra of the product isolated from Example 3 were run on a solid sample isolated by filtration from a solution adjusted to pH 2.0 by 1 molar aqueous HCl, and on a solution and film of the polymer in $H_2O$ at pH 10.0. The FT-IR spectra were recorded on a Bio-Rad FTS-60 FT-IR spectrometer. The solid sample was recorded using a KBr pellet. The liquid sample spectrum was run using a Although the invention has been described with respect to specific aspects, those skilled in the art will recognize that other aspects of the invention are intended to be included in the scope of the claims which follow.

I claim:

1. A process for making a covalently bonded polyglucosamine derivative which comprises:

(a) dispersing a salt of a polyglucosamine selected from the group consisting of chitosan lactate, chitosan epoxysuccinate, chitosan monochloroacetate, chitosan salicylate, chitosan itaconate, chitosan pyrrolidone carboxylate, chitosan glycolate, chitosan hydrochloride and mixtures thereof in an effective amount of an aqueous medium containing from about 1 to 50 weight percent caustic based on the weight of the aqueous medium to neutralize the polyglucosamine salt, promote swelling of the polyglucosamine and form a slurry of the neutralized polyglucosamine, said slurry having a pH of from about 7.5 to 14.0 and said neutralized polyglucosamine containing free amine groups;

(b) introducing an electrophilic organic reagent which is capable of reacting with the free amine groups of the neutralized polyglucosamine into the slurry;

(c) maintaining the slurry at a temperature and time effective to promote;
   (i) the substitution of the electrophilic organic reagent onto the polyglucosamine to form a covalently bonded polyglucosamine derivative; and
   (ii) the dissolution of the covalently bonded polyglucosamine derivative into the aqueous medium.

2. The process of claim 1 wherein the temperature of step (c) is from about 30° to 150° C.

3. The process of claim 1 wherein the pH of step (a) is from about 8.0 to 13.0.

4. The process of claim 1 wherein the aqueous medium contains from about 3 to 10 weight percent caustic.

5. The process of claim 1 wherein the effective amount of the aqueous medium contains effective caustic to neutralize all acidic species introduced or produced during the reaction.

6. The process of claim 1 wherein the aqueous medium further comprises a water-miscible organic solvent.

7. The process of claim 1 wherein the aqueous medium comprises less than about 10 weight percent of water-immiscible organic solvents.

8. The process of claim 7 wherein the water-immiscible organic solvent is selected from the group consisting of toluene, hexane and mixtures thereof.

9. The process of claim 1 wherein the polyglucosamine is chitosan and the electrophilic organic reagent is cis-epoxysuccinic acid.

10. The process of claim 9 wherein the covalently bonded polyglucosamine derivative is N-[(2-hydroxy-1-2-dicarboxy) ethyl chitosan.

11. The process of claim 1 wherein the polyglucosamine is chitosan and the electrophilic organic reagent is monochloroacetic acid.

12. The process of claim 11 wherein the covalently bonded polyglucosamine derivative is carboxymethyl chitosan.

13. The process of claim 1 wherein the polyglucosamine is chitosan and the electrophilic organic agent is propylene oxide.

14. The process of claim 13 wherein the covalently bonded polyglucosamine derivative is hydroxypropyl chitosan.

15. The process of claim 1 wherein the polyglucosamine is chitosan and the electrophilic agent is ethylene oxide.

16. The process of claim 15 wherein the covalently bonded polyglucosamine derivative is hydroxyethyl chitosan.

17. The process of claim 1 wherein the polyglucosamine is chitosan and the electrophilic agent is 3-chloro-2-hydroxypropyltrimethylammonium chloride.

18. The process of claim 17 wherein the covalently bonded polyglucosamine derivative is 3-(trimethylammonium chloride)-2-hydroxypropyl chitosan.

19. The process of claim 1 wherein the electrophilic organic reagent is selected from the group consisting of ethylene oxide; propylene oxide; butylene oxide; glycidol; 3-chloro-1,2-propanediol; methyl chloride; ethyl chloride; isatoic anhydride; succinic anhydride; octenylsuccinic anhydride; acetic anhydride; gamma-butyrolactone; b-propiolactone; 1,3-propanesultone; acrylamide; glycidyltrimethylammonium chloride; glycidyldimethyl alkylammonium chloride, sodium chlorosulfonate; dimethyl sulfate; sodium chloroethanesulfonate; monochloracetic acid; alkyl phenyl glycidyl ethers; glycidyl trimethoxysilanes; 1,2-epoxy dodecane and mixtures thereof.

20. The process of claim 1 wherein the electrophilic organic reagent has from about 2 to 18 carbon atoms per molecule.

21. A process for making a covalently bonded polyglucosamine derivative which comprises:

(a) dispersing a salt of a polyglucosamine selected from the group consisting of chitosan lactate, chitosan epoxysuccinate, chitosan monochloroacetate, chitosan salicylate, chitosan itaconate, chitosan pyrrolidone carboxylate, chitosan glycolate, chitosan hydrochloride and mixtures thereof in an effective amount of an aqueous medium containing from about 1 to 50 weight percent caustic based on the weight of the aqueous medium to neutralize the polyglucosamine salt, promote swelling of the polyglucosamine and form a slurry of the neutralized polyglucosamine, said slurry having a pH of from about 7.5 to 14.0 and said neutralized polyglucosamine containing free amine groups;

(b) introducing an electrophilic organic reagent selected from the group consisting of monochloroacetic acid, epoxysuccinic acid, succinic anhydride, octenylsuccinic anhydride, acetic anhydride, glycidyltrimethylammonium chloride, glycidyldimethylalkylammonium chloride, and mixtures thereof into the slurry;

(c) maintaining the slurry at a temperature and time effective to promote;
   (i) the substitution of the electrophilic organic reagent onto the polyglucosamine to form a covalently bonded polyglucosamine derivative; and
   (ii) the dissolution of the covalently bonded polyglucosamine derivative into the aqueous medium.

* * * * *